United States Patent
Lishan

(10) Patent No.: US 7,792,550 B2
(45) Date of Patent: Sep. 7, 2010

(54) METHOD OF MAGNIFYING THE FONTS ON MOBILE PHONE SCREEN BY UNFOLDING AND CARRYING AND DEVICE THEREOF

(76) Inventor: Ruan Lishan, Wenzhou Mingfa Optics Plastics Co., Ltd., KunAo Load No. 106, Ping Yang Country, Zhejiang Province (CN) 325400

( * ) Notice: Subject to any disclaimer, the term of this patent is extended or adjusted under 35 U.S.C. 154(b) by 931 days.

(21) Appl. No.: 11/498,842

(22) Filed: Aug. 4, 2006

(65) Prior Publication Data
US 2007/0105603 A1 May 10, 2007

(30) Foreign Application Priority Data
Nov. 9, 2005 (CN) .................... 2005 1 0061491

(51) Int. Cl.
*H04B 1/38* (2006.01)
*H04M 1/00* (2006.01)
(52) U.S. Cl. .................... 455/566; 455/90.3; 455/575.1
(58) Field of Classification Search ............... 455/566, 455/90.3, 575.1, 575.3, 575.4, 575.8, 95, 455/556.1, 557, 550.1; 379/433.11, 433.13, 379/428.01, 428.04; 348/E13.028, E13.029, 348/E13.044; 345/169, 156; 361/679.01, 361/683
See application file for complete search history.

(56) References Cited

U.S. PATENT DOCUMENTS

| 6,389,268 | B1 * | 5/2002 | Snyder ...................... 455/90.1 |
| 6,968,161 | B2 * | 11/2005 | Inomata et al. ............. 455/90.3 |
| 7,016,704 | B2 * | 3/2006 | Pallakoff .................... 455/566 |
| 7,068,258 | B2 * | 6/2006 | Cone et al. .................. 345/169 |
| 7,372,447 | B1 * | 5/2008 | Jacobsen et al. ............. 345/102 |
| 2001/0034250 | A1 * | 10/2001 | Chadha ...................... 455/566 |
| 2002/0032043 | A1 * | 3/2002 | Ishikawa .................... 455/566 |
| 2005/0141185 | A1 * | 6/2005 | O'Neal et al. ............... 361/683 |

* cited by examiner

*Primary Examiner*—Pablo N Tran
(74) *Attorney, Agent, or Firm*—Birch, Stewart, Kolasch & Birch, LLP

(57) ABSTRACT

A mobile telephone screen is covered with a lens, fixed on one end and set free on the other or fixed on both ends. When the fonts don't need to be magnified, the Fresnel lens tightly sticks to the mobile telephone screen; and when need, the free end of the Fresnel lens will be unfolded or both ends of it will be carried as a whole to magnify the fonts. Without increase in the thickness of mobile phone, the fonts on screen can be magnified conveniently and a magnification scale can be freely adjusted according to the magnitude of the unfold or the carry. A bridge piece in the device has the an adjustable and telescopic structure that can be adjusted according to the width of the mobile phone. A suction cup is elastic one that can adhere to the both sides of mobile phone.

6 Claims, 3 Drawing Sheets

METHOD OF MAGNIFYING THE FONTS ON MOBILE PHONE SCREEN BY UNFOLDING AND CARRYING AND DEVICE THEREOF

CROSS-REFERENCE TO RELATED APPLICATIONS

The present application claims priority under 35 USC 119 to Chinese Patent Application No. 200510061491.1 filed on Nov. 9, 2005 the entire contents of which are hereby incorporated by reference.

FIELD OF THE INVENTION

The present invention relates to communications equipment and more specifically to mobile communications equipment.

DESCRIPTION OF BACKGROUND ART

With the development of science and technology and the improvement of people's standard of living, a mobile phone has become an indispensable important communications tool in people's life.

In recent years, the global mobile phone still remains a tendency of rapid development. According to ITU statistics, Mid-2004, the total number of global mobile users has been nearly 1.5 billion accounting for a quarter of the world's population. Particularly in developing countries, the number of mobile phone users is booming. Since 2000, mobile phone users have doubled in developing countries. By the mid-2004, the total number of mobile telephone users in developing countries has been more than that in developed countries, accounting for 56% of the global number of mobile users and accounting for 79% of the market growth since 2000. At the end of 2004, the global mobile phone revenue is expected to exceed fixed telephone revenues. Globally, the growth rate of mobile phone users has not only greatly exceeded that of fixed telephone, but also that of Internet users.

Chinese mobile communications began operations in 1987, the number of users has kept a relatively high growth rate, after 10 years of rapid growth, particularly in recent years, with the introduction of competition and lower costs, mobile communications have become a hot spot of consumption. The absolute number of users has increased rapidly from 2000 to 2003 and new mobile phone users in China were 41.97 million, 59.55 million, 61.39 million and 62.69 million respectively in the four years. Especially new mobile users in China reached 64 million in 2004, the year that the growth number of new mobile users was most in recent years. The total number of users has reached 334 million accounting for about a quarter of Chinese population, which is more than the total population of the United States. The actual growth rate of Chinese mobile communications has greatly exceeded the expected objectives of the Ministry of Information Industry in the tenth five-year development program (that is, mobile phone users in China will reach a total of 260 to 290 million in 2005).

According to ITU forecasts, when the total number of global users reaches 2.5 billion, that is, the coverage rate reaches 40%, the growth rate of global mobile phone users might gradually slow down. Currently, the coverage rate of Chinese mobile phone slightly surpasses 25%, which has a considerable space to 40%.

The screen of mobile phones or Xiaolingtong is of smaller areas due to smaller volume of mobile phone that many people have used and more people will use. In order to provide enough information, the displayed fonts are relatively small, which is very inconvenient for the poor eyesight people and the elderly, often blind to the characters on phone screens. Therefore, it is difficult to operate, which makes the user-friendly mobile phones inconvenient at all. As described in Chinese patent CN200320120653.0, a mobile phone with magnifier comprises a mobile phone body provided with a magnifier base and a magnifier bracket with a magnifier set thereon. As a result, the entire thickness of mobile phone is increased considerably, which is bad in carrying for the users and makes the cost of the entire product higher.

Consequently, how to use the most effective methods and simple structure to magnify the fonts on mobile phone screen, and to facilitate the use of the poor eyesight people and the elderly has become an important research topic for a large number of enterprises.

SUMMARY AND OBJECTS OF THE INVENTION

An object of the present invention is to solve the problems of existing technologies, and provide a method of magnifying the fonts on mobile phone screen by unfolding and carrying and device thereof, which will facilitate the poor eyesight people and the elderly to use.

To achieve the above objects, the present invention provides a method of magnifying the fonts on mobile phone screen by unfolding which is covered with a Fresnel lens fixed on one end and set free on the other. When the fonts don't need to be magnified, the Fresnel lens tightly sticks to the mobile telephone screen and when needed, the free end of the Fresnel lens will be unfolded and the fonts will be magnified to display. Without an increase in the thickness of mobile phone, the fonts on mobile telephone screen can be magnified conveniently and magnification scale can be freely adjusted by means of magnitude of the unfold.

To achieve the above objects, the present invention also provides a method of magnifying the fonts on mobile phone screen by carrying, which is covered with a Fresnel lens fixed on both ends and carried as a whole. When the fonts don't need to be magnified, the Fresnel lens tightly sticks to the mobile telephone screen and when need, the Fresnel lens will be carried as a whole to magnify the fonts. Without an increase in the thickness of mobile phone, the fonts on mobile telephone screen can be magnified conveniently and the magnification scale can be freely adjusted by means of the magnitude of the carry.

To achieve the above objects, the present invention further provides a device magnifying the fonts on mobile phone screen by unfolding, comprising a Fresnel lens, with one end free and the other fixed on the bridge piece, both sides of which respectively connects with a bracket connected to the phone body.

Preferred, the device further comprises a suction cup for fixing the bracket onto the phone body.

Preferred, the suction cup is an elastic suction cup.

Preferred, the device further comprises two fixing apertures on the phone body, whereby the bracket is fixed onto the mobile phone body.

Preferred, the bridge piece can freely telescopic so as to adapt mobile phones with different widths.

To achieve the above objects, the present invention also provides a device magnifying the fonts on mobile phone screen by carrying, comprising the first Fresnel lens connecting with several running lamellas, provided with the first suction cup connected to the other end of lamellas.

To achieve the above objects, the present invention also provides a mobile phone screen for magnifying the fonts. The mobile phone screen comprises a Fresnel magnifying lens and displays sufficient word counts with larger font in the limited space.

The advantageous effects of the present invention are as follows the present invention relates to a method of magnifying the fonts on mobile telephone screen by unfolding and carrying and a device thereof. The mobile telephone screen is covered with a Fresnel lens, fixed on one end and set free on the other or fixed on both ends. When the fonts don't need to be magnified, the Fresnel lens tightly sticks to the mobile telephone screen and when needed, the free end of the Fresnel lens will be unfolded or two ends of it will be carried as a whole to magnify the fonts. Without an increase in the thickness of the mobile phone, the fonts on the mobile telephone screen can be magnified conveniently and magnification scale can be freely adjusted by means of magnitude of the unfold or the carry. A bigger magnification rate in a shorter distance can be produced through using a Fresnel lens of a short focus and small screw pitch to magnify the fonts on the mobile phone screen. The bracket of lens is of fixed height, therefore, the distance between the Fresnel lens and Mobile phone is fixed and the magnification scale is stabilized. Due to a planar Fresnel lens used, the sight scope of users is enlarged. The brim of the lens bracket is composed of elastic materials which can very firmly attach to various mobile phones or other equipments of small screen, or bond with mobile phone screen by means of stickers/rubber belts at the bottom of lens bracket. Also the present invention is directed to a mobile phone screen for magnifying the fonts, which is directly made of the magnifying Fresnel lens and can display sufficient word counts with larger font in the limited space. The above method and device have solved the problem of magnifying the fonts on mobile phone and required low cost, at the same time, greatly facilitated the poor eyesight people and the elderly and become popular among them.

The characteristics and advantages of the present invention will be specifically described through the examples combined with the attached drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiment 1

Figure 1:
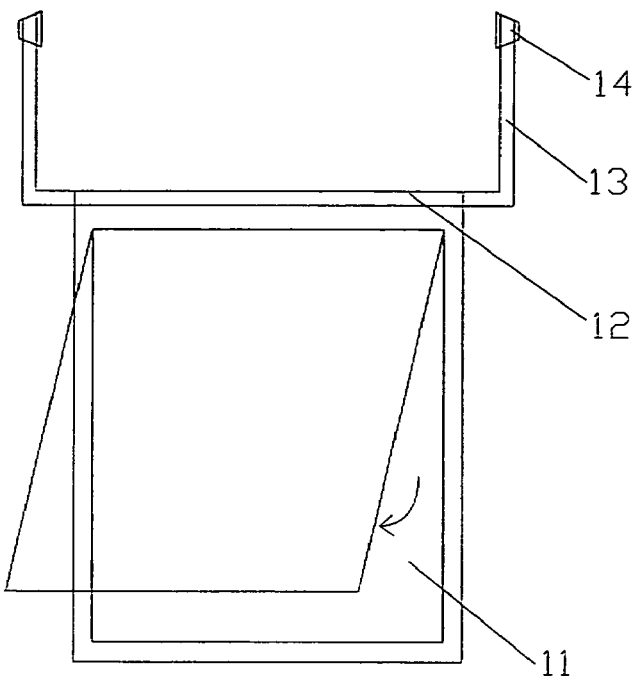
FIG. 1 is a schematic illustration for using the method of magnifying the fonts on mobile phone screen by unfolding.

FIG. 1 is a schematic illustration for using the method of magnifying the fonts on mobile phone screen by unfolding. A method of magnifying the fonts on mobile phone screen by unfolding is provided, wherein the screen is covered with a Fresnel lens, fixed on one end and set free on the other. When the fonts don't need to be magnified, the Fresnel lens tightly sticks to the mobile telephone screen; and when needed, the free end of the Fresnel lens will be unfolded and the fonts will be magnified to display. Without an increase in the thickness of mobile phone, the fonts on mobile telephone screen can be magnified conveniently with a magnification scale that can be freely adjusted by means of the magnitude of the unfold. On magnifying, it is necessary for Fresnel lens to keep a desired distance away from the magnified object. Consequently, when it is used for magnifying the fonts on mobile phone, it is inevitable to increase the thickness of mobile phone. The present embodiment can break through the conventional technology, where the Fresnel lens is set tightly close to the mobile telephone screen with one end fixed. When the fonts don't need to be magnified, it can be used normally, when need, the free end of the Fresnel lens will be unfolded or carried as a whole to achieve a magnification function. In addition, the magnification scale can be selected according to the requirements. The larger the magnitude of unfolding or carrying is, the bigger is the magnification scale. The present embodiment can realize a magnification function without an increase in the thickness of the mobile phone for greatly facilitating the carrying and use of mobile phone users.

Figure 2:
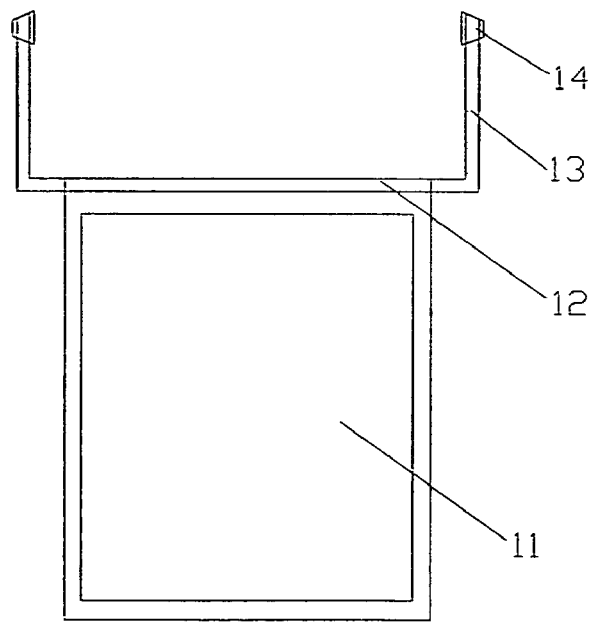
FIG. 2 is a structural schematic illustration for a device magnifying the fonts on mobile phone screen by unfolding.
Figure 3:
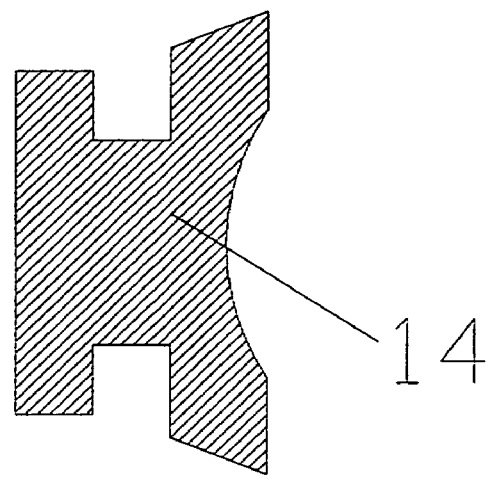
FIG. 3 is a structural schematic illustration of a suction cup in the device magnifying the fonts on mobile phone screen by unfolding.
Figure 4:
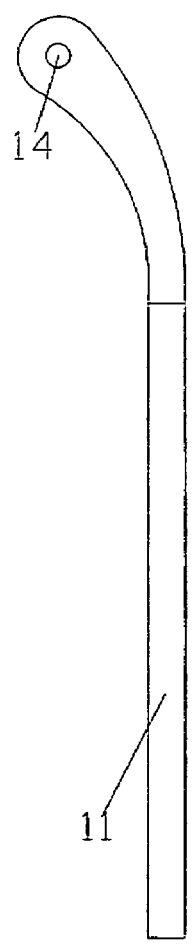
FIG. 4 is an A-A schematic cross-sectional view of FIG. 2.

FIG. 2 is a structural schematic illustration for a device magnifying the fonts on mobile phone screen by unfolding. FIG. 4 is an A-A schematic cross-sectional view of FIG. 2 and is an embodiment for the above method. The device comprises a Fresnel lens 11 with one end free and the other fixed on the bridge piece 12, both sides of which respectively connects with brackets 13 connected to the phone body. The device further comprises a suction cup 14 fixing the bracket 13 onto the phone body and the suction cup may be an elastic suction cup. Also, the device may comprise two fixing apertures on the phone body, whereby the bracket is fixed onto the mobile phone body. The bridge piece 12 can freely telescopic so as to adapt mobile phones with different widths. Because the magnification scale of magnifying can be adjusted flexibly by means of magnitude of the unfold, the focus of the Fresnel lenses 11 may not be specially limited in the embodiment, even a longer focus doesn't need to increase the thickness of mobile phones. In order to provide the generality of the present device and enable it to suitably apply to mobile phones with different widths, the adjustably telescopic structure is used for the bridge piece 12. When the width of mobile phone is broad, it will be extended and the width will be shortened for the mobile phone with narrow width. Thus, the present device can be applied to mobile phones with all widths. Bracket 13 is required to have certain intensity and can be made from steel, stainless steel, high-strength plastic material or some other materials with certain intensity. FIG. 3 is a structural schematic illustration of a suction cup in the device of magnifying the fonts on mobile phone screen by unfolding. In general, the suction cup 14 is elastic and can be made from nylon or rubber materials. Because not all mobile phones are of smooth surfaces without gaps, for that whose surface is not smooth or with gaps, Sticker or strong glue can be used on the surface of suction cup, as a result, it can be very firmly affixed on the mobile phone.

Embodiment 2

Figure 5:
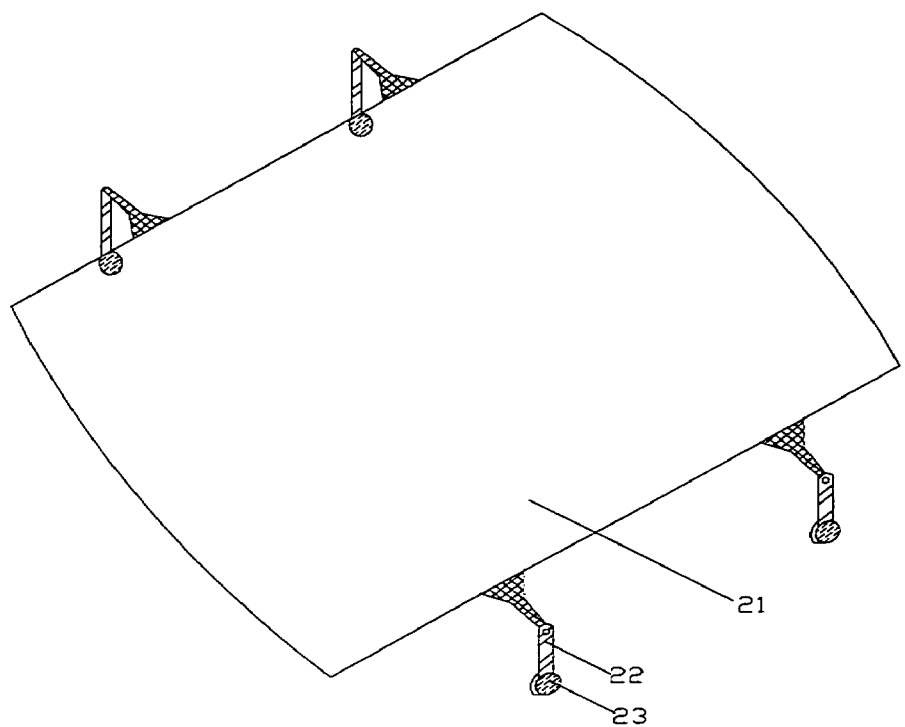
FIG. 5 is a structural schematic illustration for a device magnifying the fonts on mobile phone screen by carrying.
Figure 6:
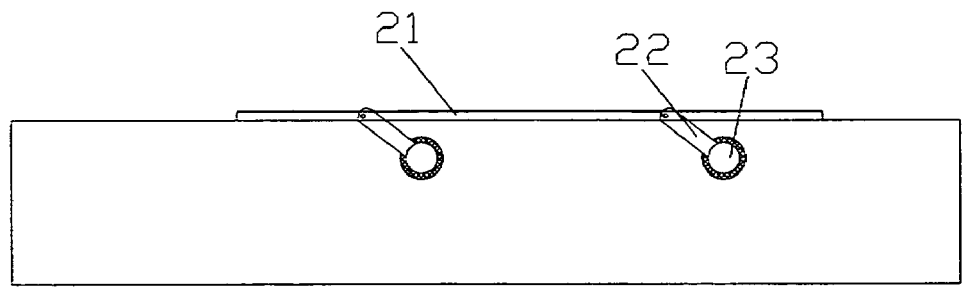
FIG. 6 is a referenced illustration for state in using the device magnifying the fonts on mobile phone screen by unfolding.

FIG. 5 is a structural schematic illustration for a device of magnifying the fonts on mobile phone screen by carrying. FIG. 6 is a referenced illustration for state in using the device of magnifying the fonts on mobile phone screen by carrying. The device comprises the first Fresnel lens 21 connected with several running lamellas 22, provided with the first suction cup 23 connected on the other end of lamellas. The running lamella 22 can rotate in the first suction cup 23 adsorbed onto the side of mobile phone, otherwise, the first suction cup 23 can rotated on the side of mobile phone. The height of the first Fresnel lens 21 can be adjusted by rotating, thereby adjusting the distance between the first Fresnel lens 21 and the mobile phone screen by carrying as a whole, so as to magnify the fonts on the mobile phone screen. A Fresnel lens is used as the first Fresnel lens 21. To further achieve short distance and high magnification rate, short focus and small screw-pitch Fresnel-Fresnel lens is used for magnifying the fonts in the present invention. The focus of Fresnel-Fresnel lens is set between 30 mm-50 mm and screw-pitch between 0.10 mm-0.5 mm. The connection of the first Fresnel 21 and the running lamella 22 is adjustable. There is no special requirement for material used by the running lamella 22, except a demand to bear special intensity. In general, thin iron sheet is used as the material of running lamella, and other materials can also be used. The first suction cup 23 is elastic, and nylon or rubber materials can be used as its material. Because not all mobile phones are of smooth surfaces without gaps, for those surfaces that are not smooth or with gaps, a sticker or strong glue can be used on the surface of suction cup, as a result, it can be very firmly affixed on the mobile phone.

Embodiment 3

A magnified Fresnel lens is directly used as mobile phone screen so that it can display sufficient word counts with larger font in the limited space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for magnifying images on a mobile phone screen, comprising:
   a telescopic bridge piece extending laterally across an upper face of the mobile phone;
   left and right brackets projecting orthogonally from each end of the bridge piece and extending, respectively, along portions of left and right facing sides of a body of the mobile phone;
   left and right fixing members for respectively attaching distal ends of the left and right brackets to the left and right facing sides of the body of the mobile phone;
   a Fresnel lens having one end directly connected to the bridge piece in a manner such that the Fresnel lens is pivotable about an axis of the bridge piece;
   wherein the Fresnel lens is pivotable about the bridge piece between a position lying flat against and covering the screen of the mobile phone, in which case the images on the screen are not magnified, to one or more positions in which a plane of the Fresnel lens is oriented at an acute angle with respect to the screen, in which case the images on the screen are magnified when viewed by a user viewing the screen through the Fresnel lens.

2. The device magnifying images on a mobile phone screen according to claim 1, wherein the left and right fixing members are suction cups for respectively attaching the distal ends of left and right brackets to the left and right facing sides of the mobile phone body.

3. The device magnifying images on a mobile phone screen according to claim 2, wherein the suction cups are elastic suction cups.

4. The device magnifying images on a mobile phone screen according to claim 1, wherein the body of the mobile phone comprises two fixing apertures formed, respectively on the left and right facing sides of body of the mobile phone for fixing the distal ends of the left and right brackets onto the body of the mobile phone.

5. The device magnifying images on a mobile phone screen according to claim 1, wherein the bridge piece is freely telescopic in order to position and attach the left and right brackets along the left and right facing sides of mobile phones with bodies of different widths.

6. A method of magnifying images on a mobile phone screen, the mobile phone having a telescopic bridge piece extending laterally across an upper face of the mobile phone; left and right brackets projecting orthogonally from each end of the bridge piece and extending, respectively, along portions of left and right facing sides of a body of the mobile phone; left and right fixing members for respectively attaching distal ends of the left and right brackets to the left and right facing sides of the body of the mobile phone; and a Fresnel lens having one end directly connected to the bridge piece in a manner such that the Fresnel lens is pivotable about an axis of the bridge piece, the method comprising;
   pivoting the Fresnel lens about the bridge piece to a position flat against and covering the screen of the mobile phone, in which case the images on the screen are not magnified; and
   pivoting the Fresnel lens about the bridge piece to one or more positions in which a plane of the Fresnel lens is oriented at an acute angle with respect to the screen, in which case the images on the screen are magnified when viewed by a user viewing the screen through the Fresnel lens.

* * * * *